(12) United States Patent
Bang et al.

(10) Patent No.: US 9,431,866 B2
(45) Date of Patent: Aug. 30, 2016

(54) MOTOR AND WASHING MACHINE HAVING THE SAME

(71) Applicant: SAMSUNG ELECTRONICS CO., LTD., Suwon-si, Gyeonggi-do (KR)

(72) Inventors: Myung Bae Bang, Pyeongtaek-si (KR); Byung Ryel In, Yongin-si (KR); Woong Hwang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 184 days.

(21) Appl. No.: 14/021,133

(22) Filed: Sep. 9, 2013

(65) Prior Publication Data

US 2014/0069150 A1    Mar. 13, 2014

(30) Foreign Application Priority Data

Sep. 12, 2012  (KR) ........................ 10-2012-0101261

(51) Int. Cl.
*H02K 5/10*    (2006.01)
*D06F 37/20*    (2006.01)

(52) U.S. Cl.
CPC ............... *H02K 5/10* (2013.01); *D06F 37/206* (2013.01)

(58) Field of Classification Search
None
See application file for complete search history.

(56) References Cited

U.S. PATENT DOCUMENTS

| | | | |
|---|---|---|---|
| 6,544,009 B2* | 4/2003 | Makino et al. | 417/312 |
| 7,271,512 B2* | 9/2007 | Lee et al. | 310/43 |
| 8,242,656 B1* | 8/2012 | Lin | H02K 1/146 310/194 |
| 2011/0197637 A1* | 8/2011 | Jun | D06F 37/04 68/140 |

* cited by examiner

*Primary Examiner* — Michael Barr
*Assistant Examiner* — Cristi Tate-Sims
(74) *Attorney, Agent, or Firm* — Staas & Halsey LLP

(57) ABSTRACT

A motor having an improved structure that prevents infiltration of moisture into the motor and a washing machine having the same. A washing machine includes a body, a tub disposed in the body, a drum rotatably disposed in the tub, and a motor including a stator coupled to a rear surface of the tub and a rotor rotatably disposed inside the stator. The stator includes a stator core, a first insulator and a second insulator to cover both ends of the stator core, and at least one moisture infiltration prevention member disposed between the first insulator and the second insulator to prevent infiltration of moisture into the stator core.

8 Claims, 10 Drawing Sheets

MOTOR AND WASHING MACHINE HAVING THE SAME

CROSS-REFERENCE TO RELATED APPLICATIONS

This application claims the benefit of Korean Patent Application No. 10-2012-0101261, filed on Sep. 12, 2012 in the Korean Intellectual Property Office, the disclosure of which is incorporated herein by reference.

BACKGROUND

1. Field

Embodiments of the present disclosure relate to a motor to generate rotating force and a washing machine having the same.

2. Description of the Related Art

A washing machine, which washes clothes using electricity, generally includes a tub to retain wash water, a drum rotatably installed in the tub and a motor to rotate the drum.

The motor, which produces rotating power from electric energy, is provided with a stator and a rotor. The rotor is configured to electromagnetically interact with the stator, and is rotated by force acting between a magnetic field and current flowing through a coil.

The motor is generally mounted to rear wall of the tub. The motor mounted to the rear wall of the tub is exposed to moisture formed on the outer surface of the cabinet or tub.

If the moisture reaches the motor due to gravity or vibration caused by rotation of the drum infiltrates the motor, a short circuit may occur, causing the motor to malfunction or stop.

SUMMARY

Therefore, it is an aspect of the present disclosure to provide a motor having an improved structure that prevents infiltration of moisture into the motor and a washing machine having the same.

It is another aspect of the present disclosure to provide a motor having an improved structure that may enhance productivity and ease of assembly of the motor and a washing machine having the same.

Additional aspects of the disclosure will be set forth in part in the description which follows and, in part, will be apparent from the description, or may be learned by practice of the disclosure.

In accordance with one aspect of the present disclosure, a washing machine includes a body, a tub disposed in the body, a drum rotatably disposed in the tub, and a motor including a stator coupled to a rear surface of the tub and a rotor rotatably disposed inside the stator, wherein the stator includes a stator core, a first insulator and a second insulator to cover both ends of the stator core, and at least one moisture infiltration prevention member disposed between the first insulator and the second insulator to prevent infiltration of moisture into the stator core.

The moisture infiltration prevention member may protrude from one of the first insulator and the second insulator in an axial direction of the stator core.

The moisture infiltration prevention member may be adapted to cover at least one portion of a lateral surface of the stator core along a circumferential direction of the stator core.

The moisture infiltration prevention member may be adapted to cover at least half of the lateral surface of the stator core.

The first insulator may include at least one connection rib protruding from one end thereof facing the second insulator and connected to the second insulator, and the second insulator may include at least one fixing rib protruding from one end thereof facing the tub to contact the tub and disposed at a position corresponding to a position of the connection rib.

The first insulator may include a first through hole formed through the connection rib, and the second insulator may include a second through hole formed through the fixing rib and disposed concentric with the first through hole.

The moisture infiltration prevention member may include at least one accommodation portion to accommodate the connection rib.

The stator may include a plurality of back yokes disposed between the stator core and the first insulator and second insulator to support the stator core.

The back yokes may be disposed spaced apart from each other along a circumferential direction of the stator core.

The back yokes may be inserted between an outer circumferential surface of the stator core and inner circumferential surfaces of the first insulator and the second insulator.

The first insulator may include a plurality of accommodation grooves to accommodate the back yokes, wherein the accommodation grooves are formed on the inner circumferential surface of the first insulator facing the outer circumferential surface of the stator core.

In accordance with another aspect of the present disclosure, a motor includes a stator provided with a stator core and an insulator to cover the stator core, and a rotor to rotate by electromagnetically interacting with the stator, wherein the insulator includes a plurality of first insulation covers to cover both ends of the stator core, and at least one second insulation cover disposed between the first insulation covers to cover at least one portion of a lateral surface of the stator core along a circumferential direction of the stator core.

The second insulation cover may be adapted to cover at least half of the lateral surface of the stator core.

The second insulation cover may be integrated with one of the first insulation covers.

The stator core may include a ring-shaped core body, and a plurality of core teeth extending inward from an inner circumferential surface of the core body in a radial direction of the core body.

The stator may include a plurality of back yokes adapted to contact an outer circumferential surface of the core body to support the stator core, and disposed spaced apart from each other along a circumferential direction of the stator core.

An inner circumferential surface of each of the first insulation covers facing the outer circumferential surface of the core body may be provided with an accommodation groove to accommodate at least one portion of the back yokes.

In accordance with another aspect of the present disclosure, a motor including a stator and a rotor rotatably disposed inside the stator, wherein the stator includes a stator core, and an insulator assembly provided with a plurality of unit insulators to cover at least one portion of the stator core.

The insulator assembly may be provided with a plurality of first unit insulators and second unit insulators alternately disposed along a circumferential direction of the stator core, wherein both ends of each of the first unit insulators are provided with a coupling groove, and both ends of each of the second unit insulators are provided with a coupling protrusion to be coupled to the coupling groove.

Each of the unit insulators may include a body formed along a circumferential direction of the stator core, a plurality of teeth extending inward from the body in a radial direction of the stator core, and at least one through hole formed through the body in an axial direction of the stator core.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
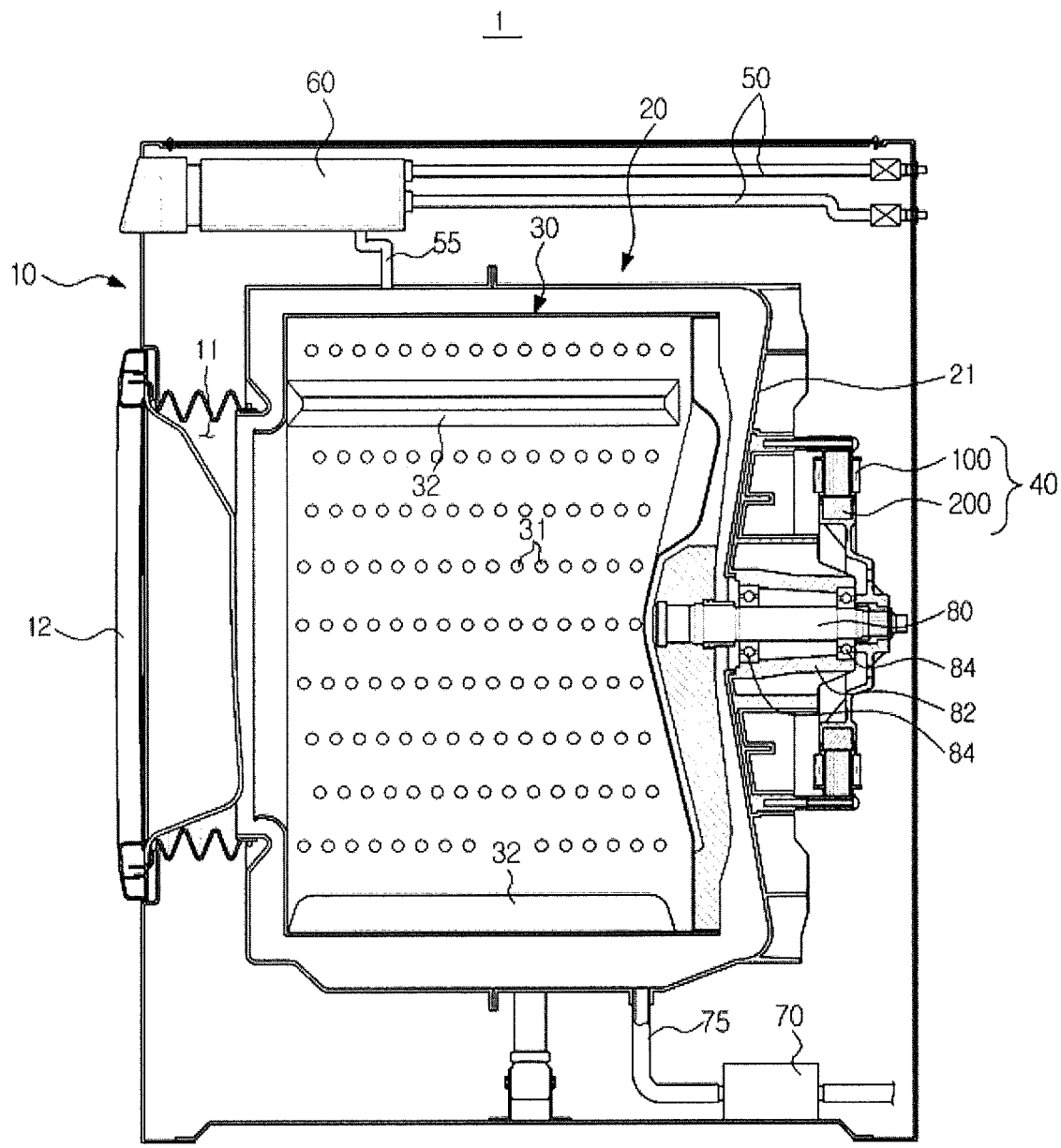
FIG. 1 is a view illustrating a washing machine according to an exemplary embodiment of the present disclosure.

Reference will now be made in detail to the embodiments of the present disclosure, examples of which are illustrated in the accompanying drawings, wherein like reference numerals refer to like elements throughout. Hereinafter, a description will be given of a washing machine with a motor, which is applicable to all kinds of apparatuses including an air conditioner, an electric vehicle, a light rail transit system, an electric bicycle and a small generator that employ a motor as a power source. Hereinafter, a washing machine will be described as an example of application of the motor.

FIG. 1 is a view illustrating a washing machine according to an exemplary embodiment of the present disclosure.

As shown in FIG. 1, the washing machine 1 includes a cabinet 10 forming the outward appearance of the washing machine 1, a tub 20 disposed within the cabinet 10, a drum 30 rotatably disposed in the tub 20, and a motor 40 to rotate the drum 30.

The front portion of the cabinet 10 is provided with an inlet 11 through which laundry may be inserted into the drum 30. The inlet 11 is opened and closed by a door 12 installed at the front of the cabinet 10.

A water supply pipe 50 to supply wash water to the tub 20 is installed at an upper portion of the tub 20. One side of the water supply pipe 50 is connected to an external water supply source (not shown), and the other side of the water supply pipe 50 is connected to a detergent supply unit 60. The detergent supply unit 60 is connected to the tub 20 through a connection pipe 55. Water flowing into the water supply pipe 50 is supplied to the tub 20 along with detergent via the detergent supply unit 60.

Installed at the lower portion of the tub 20 are a drain pump 70 and drain pipe 75 to discharge water in the tub 20 from the cabinet 10.

A plurality of through holes 31 is formed around the drum 30 to allow flow of wash water therethrough, and a plurality of lifters 32 is installed on the inner circumferential surface of the drum 30 to allow the laundry to tumble during rotation of the drum 30.

The drum 30 and motor 40 are connected to each other through a drive shaft 80. The drive shaft 80 transmits rotating power of the motor 40 to the drum 30. One end of the drive shaft 80 is connected to the drum 30, and the other end of the drive shaft 80 extends to the outside of the rear wall 21 of the tub 20.

Installed at the rear wall 21 of the tub 20 is a bearing housing 82 by which the drive shaft 80 is rotatably supported. The bearing housing 82 may be formed of an aluminum alloy, and may be inserted into the rear wall 21 of the tub 20 when the tub 20 is manufactured through injection molding. Bearings 84 are installed between the bearing housing 82 and the drive shaft 80 to allow smooth rotation of the drive shaft 80.

Figure 2:
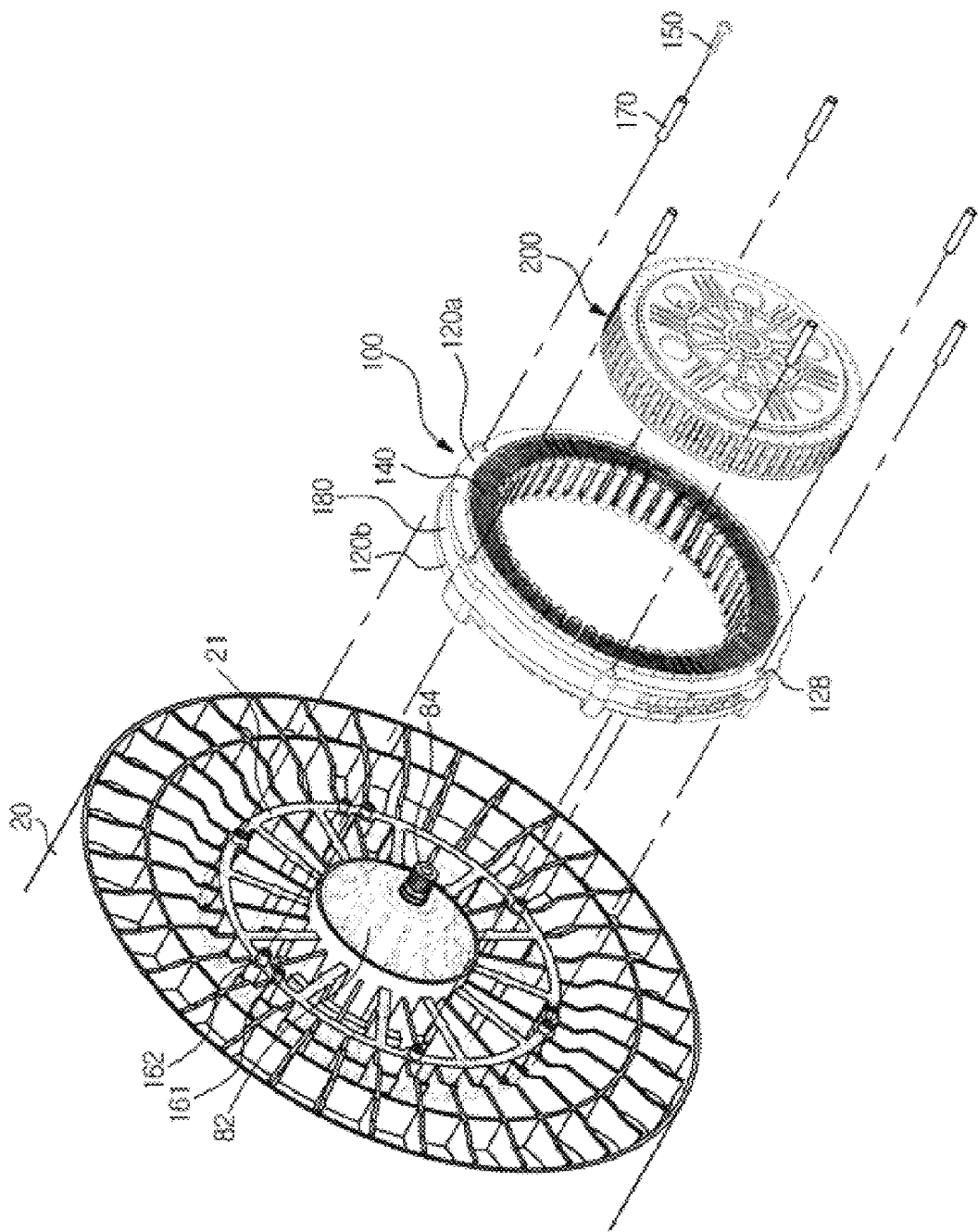
FIG. 2 is a view illustrating a tub and a stator and rotor of a motor of the washing machine according to the exemplary embodiment of the present disclosure, in which the tub, stator and rotor are separated from each other.
Figure 3:
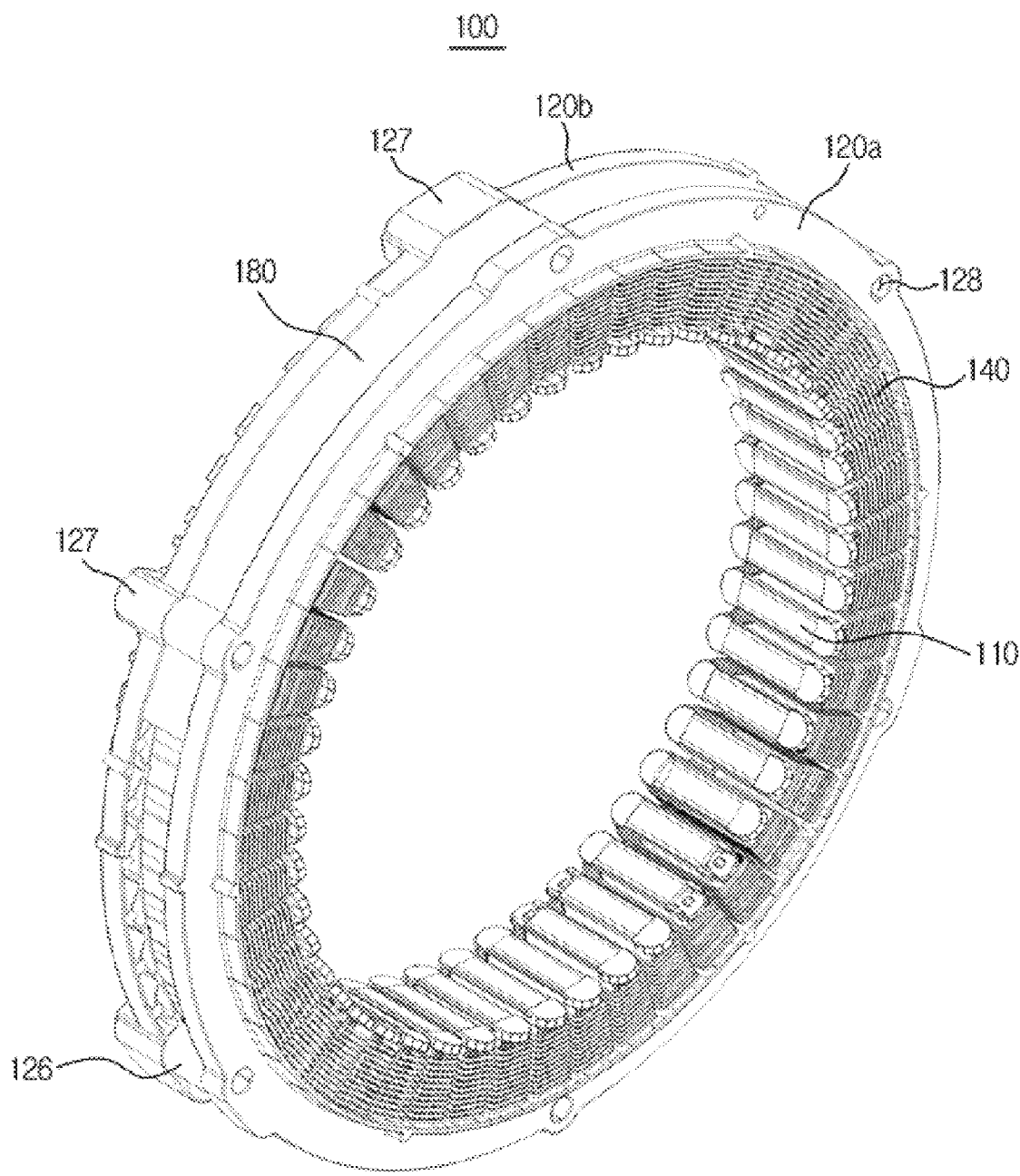
FIG. 3 is a perspective view of the stator of FIG. 2.
Figure 4:
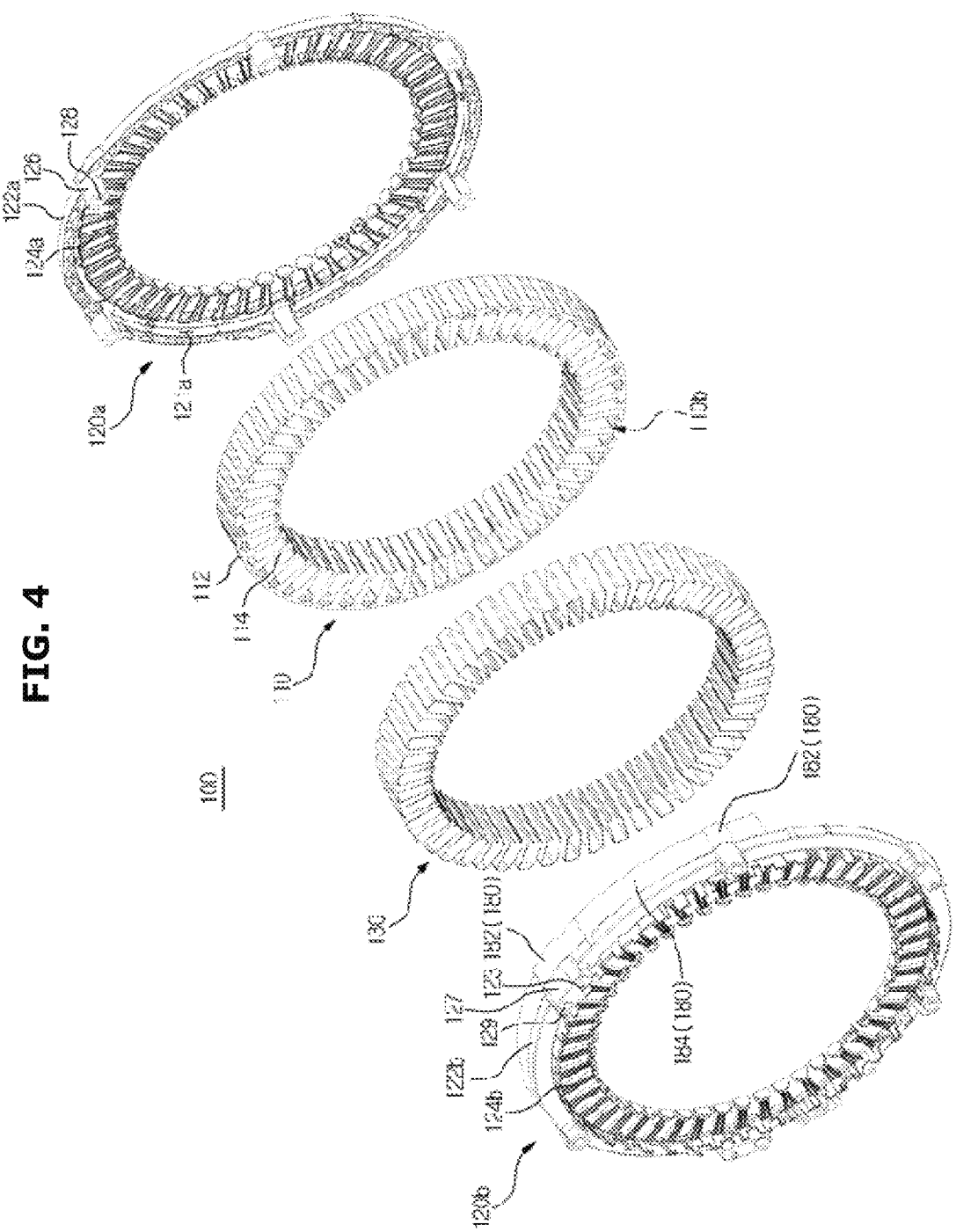
FIG. 4 is an exploded perspective view illustrating constituents of the stator of FIG. 3, which are separated from each other.
Figure 5:
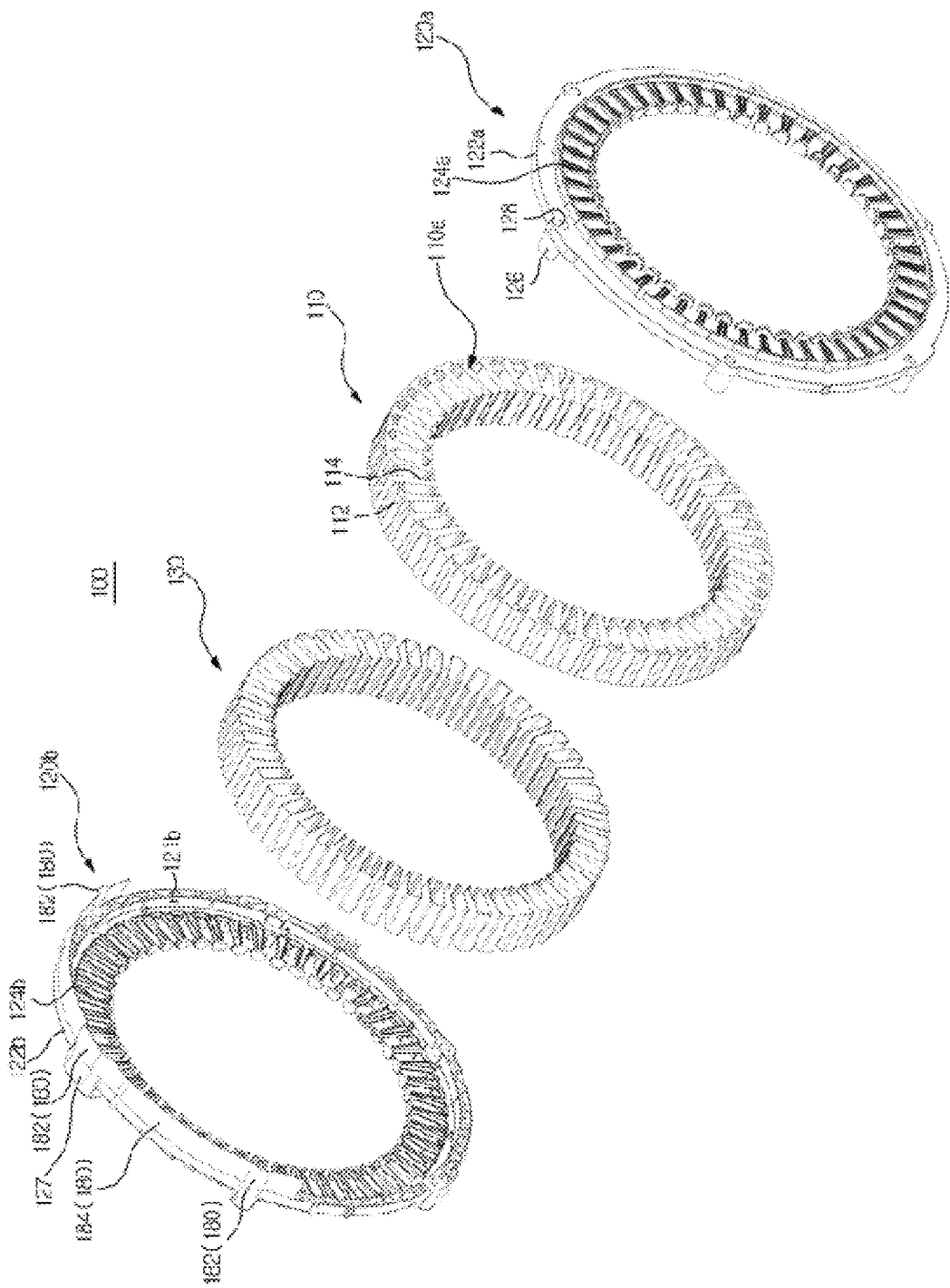
FIG. 5 is an exploded perspective view of FIG. 4 taken at a different angle.

FIG. 2 is a view illustrating a tub and a stator and rotor of a motor of the washing machine according to the exemplary embodiment of the present disclosure, in which the tub, stator and rotor are separated from each other, and FIG. 3 is a perspective view of the stator of FIG. 2. FIG. 4 is an exploded perspective view illustrating constituents of the stator of FIG. 3, which are separated from each other, and FIG. 5 is an exploded perspective view of FIG. 4 taken at a different angle. The coil is shown in FIGS. 4 and 5.

As shown in FIGS. 1 to 5, the motor 40 is coupled to the outside of the tub 20 to drive the drum 30 to rotate in opposite directions. The motor 40 includes a stator 100 mounted to the rear wall 20 of the tub 20, and a rotor 200 disposed around the stator 100 to rotate by electromagnetically interacting with the stator 100.

The stator 100 includes a stator core 110 formed of a metal material, a first insulator 120a and a second insulator 120b covering both ends 110a and 110b of the stator core 110, an insulation film 130 inserted between the first insulator 120a and the second insulator 120b, a coil 140 wound around the first insulator 120a, second insulator 120b and insulation film 130. The stator core 110 may be formed by stacking metal plates processed through press working. The first insulator 120a, second insulator 120b and insulation film 130 may be formed of materials having a property of electrical insulation.

The stator core 110 includes a ring-shaped core body 112, and a plurality of core teeth 114 extending inward from the inner circumferential surface of the core body 112 in the radial direction of the core body 112 and arranged spaced apart from each other along the inner circumferential surface of the core body 112.

The first insulator 120a includes a first insulator body 122a having a shape corresponding to that of the core body 112, and a plurality of first insulator teeth 124a having a shape corresponding that of the core teeth 114. The first insulator teeth 124a extend inward in the radial direction of the first insulator body 122a and are arranged spaced apart from each other along the inner circumferential surface of the first insulator body 122a.

The first insulator 120a further includes a plurality of connection ribs 126 connected to the second insulator 120b, and first through holes 128 to fix the tub 20 to the rear wall 21 therethrough. The connection ribs 126 protrude from the first insulator body 122a toward the second insulator 120b, are arranged spaced a predetermined distance apart from each other in the circumferential direction of the first insulator body 122a and are adapted to be connected to the second insulator 120b when the stator core 110, first insulator 120a and second insulator 120b are coupled to each other. The first through holes 128 are formed through the first insulator body 122a and the connection rib 126. Sleeves 170 may be inserted into the first through holes 128 to reinforce fastening of the stator 100 to the tub 20.

The length of the connection rib 126 protruding from the first insulator 120a may vary depending on the stack height of the stator core 110. That is, if the stack of the stator core 110 is high, the connection rib 126 may be formed to have a long protruding length. If the stack of the stator core 110 is short, the connection rib 126 may be formed to have a short protruding length. If the connection ribs 126 and the first insulator 120a are integrally formed through injection molding, a mold for injection molding of the first insulator 120a does not need to be separately fabricated whenever the length of the connection ribs 126 changes according to change in the stack height of the stator core 110, but one mold may be used in common. The length of the connection ribs 126 may be adjusted during fabrication of the first insulator 120a through injection molding by filling a portion of the mold for formation of the connection ribs 126, which is pre-formed to have a deep depth, to the height corresponding to the protruding length of the connection ribs 126, using a tool such as a jig.

The second insulator 120b includes a second insulator body 122b having a shape corresponding to that of the core body 112, and a plurality of second insulator teeth 124b having a shape corresponding to that of the core teeth 114. The second insulator teeth 124b extend inward in the radial direction of the second insulator body 122b and are arranged spaced apart from each other along the inner circumferential surface of the second insulator body 122b.

The second insulator 120b further includes a plurality of fixing ribs 127 connected to the tub 20, second through holes 129 formed through the second insulator body 122b and the fixing rib 127, and a plurality of fixing pins 123 protruding from surfaces of the fixing ribs 127 facing the rear wall 21 of the tub 20 toward the rear wall 21 of the tub 20. The fixing ribs 127 protrude from the second insulator body 122b toward the rear wall 21 of the tub 20, and are arranged spaced a predetermined distance apart from each other in the circumferential direction of the second insulator body 122b. The fixing ribs 127 contact the rear wall 21 of the tub 20 when the stator 110 is coupled to the tub 20. The fixing pins 123 are adapted to determine the position of the stator 100 before being inserted into the rear wall 21 of the tub 20 to fix the stator 100 to the rear wall 21 of the tub 20. The second through holes 129 are formed through the second insulator body 122b and the fixing ribs 127, and are disposed to be concentric with the first through holes 128. Sleeves 170 may be inserted into the second through holes 129 to reinforce fastening of the stator 100 to the tub 20.

First accommodation holes 161 to accommodate the fixing pins 123 inserted thereinto and second accommodation holes 162 to accommodate fixing members 150 inserted thereinto are provided at the rear wall 21 of the tub 20 to which the stator 100 is mounted.

The first accommodation holes 161 allow the position of the stator 100 to be determined before the fixing pins 142 are accommodated therein to fix the stator 100 to the rear wall 21 of the tub 20, while the second accommodation holes 162 accommodate the fixing members 150 penetrating the sleeves 170, thereby allowing the stator 100 to be fixed to the rear wall 21 of the tub 20.

Provided between the first insulator 120a and the second insulator 120b is a moisture infiltration prevention member 180 to prevent infiltration of moisture into the stator core 110.

The moisture infiltration prevention member 180 extends in the circumferential direction of the stator core 110 to cover at least one portion of the lateral surface of the stator core 110 that is not covered by the first insulator 120a and second insulator 120b which cover both ends of the stator core 110.

The moisture infiltration prevention member 180 includes a rib accommodation portion 182 and a moisture guide surface 184. The rib accommodation portion 182 is formed to accommodate at least one portion of the connection rib 126 at the position where the connection rib 126 is disposed. Accordingly, when the first insulator 120a and the second insulator 120b are coupled to both ends of the stator core 110, the moisture infiltration prevention member 180 and the first insulator 120a do not interfere with each other. The moisture guide surface 184 is provided on the outer surface of the moisture infiltration prevention member 180 to guide movement of water reaching the upper portion of the stator 100 such that the water does not infiltrate the stator 100, instead flowing to the lower portion of the stator 100 by gravity. To securely prevent infiltration of water into the stator 100 through the lateral surface of the stator 100, the moisture infiltration prevention member 180 may be arranged in the circumferential direction of the stator core 110 to cover at least half of the lateral surface of the stator core 110.

As described above, the first insulator 120a and the second insulator 120b cover both ends of the stator core 110, and the moisture infiltration prevention member 180 covers the lateral surface of the stator core 110. In this sense, the first insulator 120a and the second insulator 120b may be defined as a first insulation cover, and the moisture infiltration prevention member 180 may be defined as a second insulation cover.

The moisture infiltration prevention member 180 may be integrated with the second insulator 120b and extend from the second insulator 120b toward the first insulator 120a to be connected to the first insulator 120. Although not shown in FIGS. 1 to 5, the moisture infiltration prevention member 180 may be integrated with the first insulator 120a. In this case, the moisture infiltration prevention member 180 extends from the first insulator 120a toward the second insulator 120b to be connected to the second insulator 120b.

The length of the moisture infiltration prevention member 180 extending from the first insulator 120a or second insulator 120b may vary depending on the stack height of the stator core 110. That is, if the stack of the stator core 110 is high, the moisture infiltration prevention member 180 may extend to a long length. If the stack of the stator core 110 is short, the moisture infiltration prevention member 180 may have a short length. If the moisture infiltration prevention member 180 is integrated with one of the first insulator 120a and the second insulator 120b through injection molding, a mold for injection molding used to form the first insulator 120a and the second insulator 120b does not need to be separately fabricated whenever the length of the moisture infiltration prevention member 180 changes according to change in the stack height of the stator core 110, but one mold may be used in common. The length of the moisture infiltration prevention member 180 may be adjusted during fabrication of the first insulator 120a and the second insulator 120b through injection molding by filling a portion of the mold for formation of the moisture infiltration prevention member 180, which is pre-formed to have a deep depth, to a height corresponding to the length of the moisture infiltration prevention member 180, using a tool such as a jig.

Figure 6:
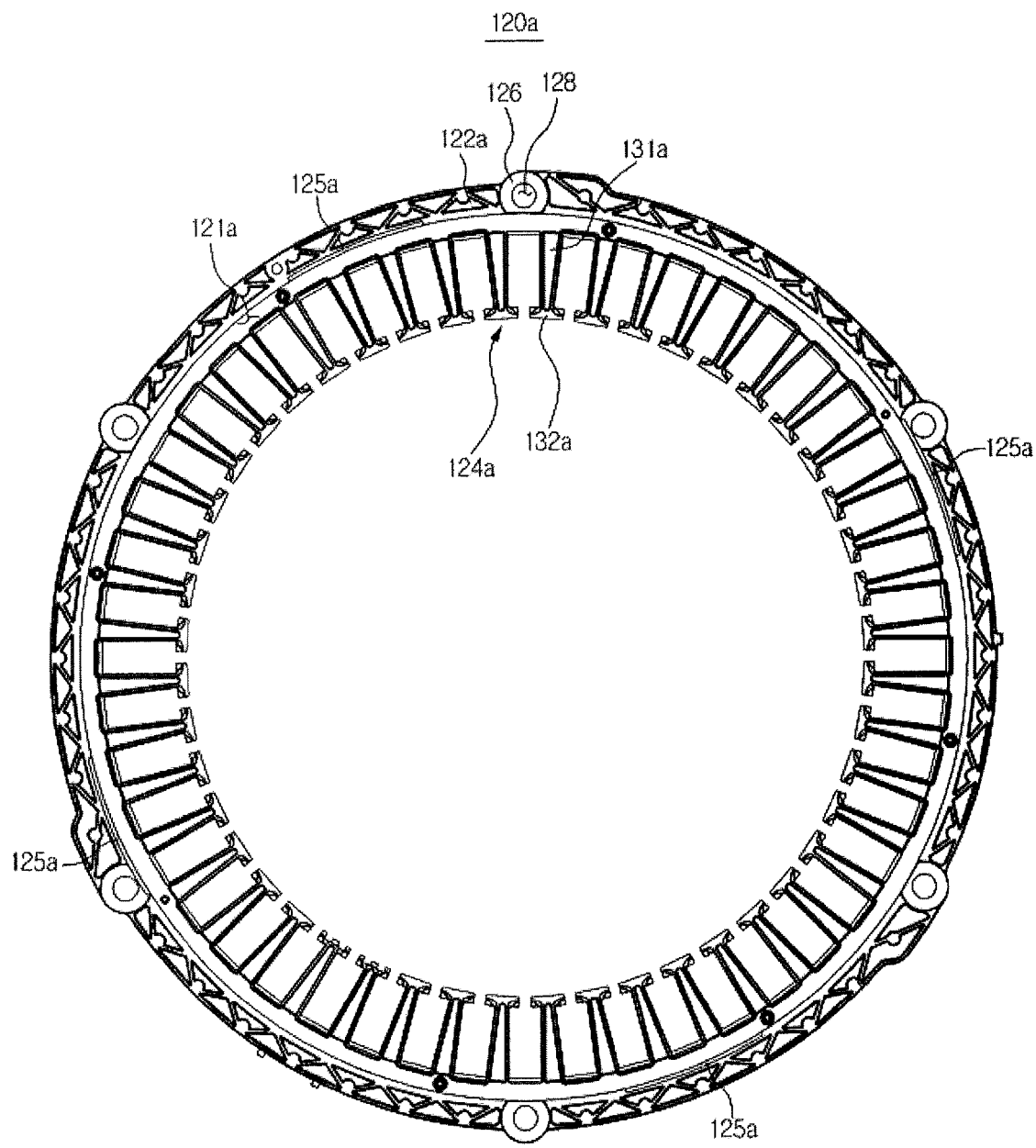
FIG. 6 is a plan view illustrating the inside of a first insulator.
Figure 7:
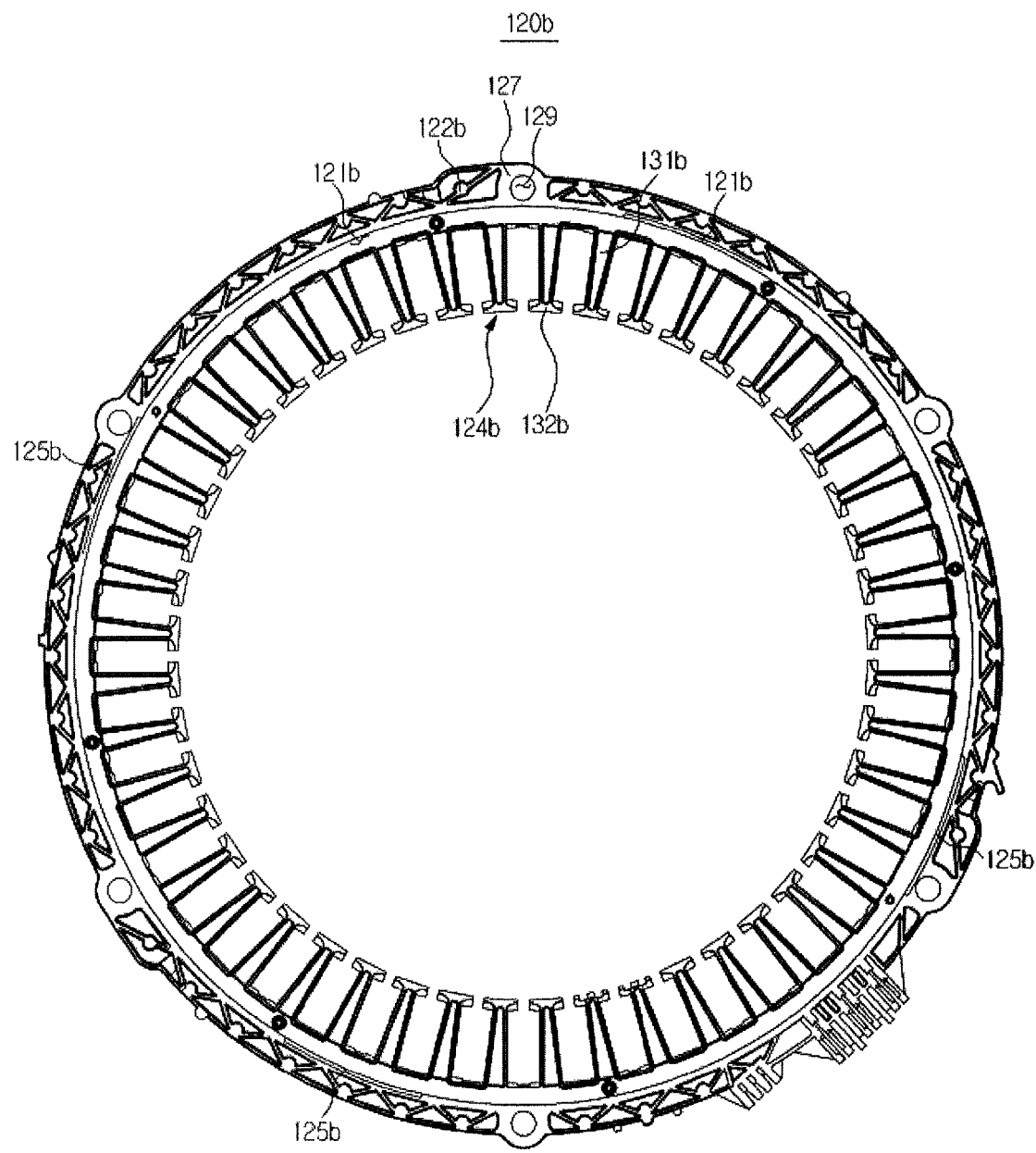
FIG. 7 is a plan view illustrating the inside of a second insulator.
Figure 8:
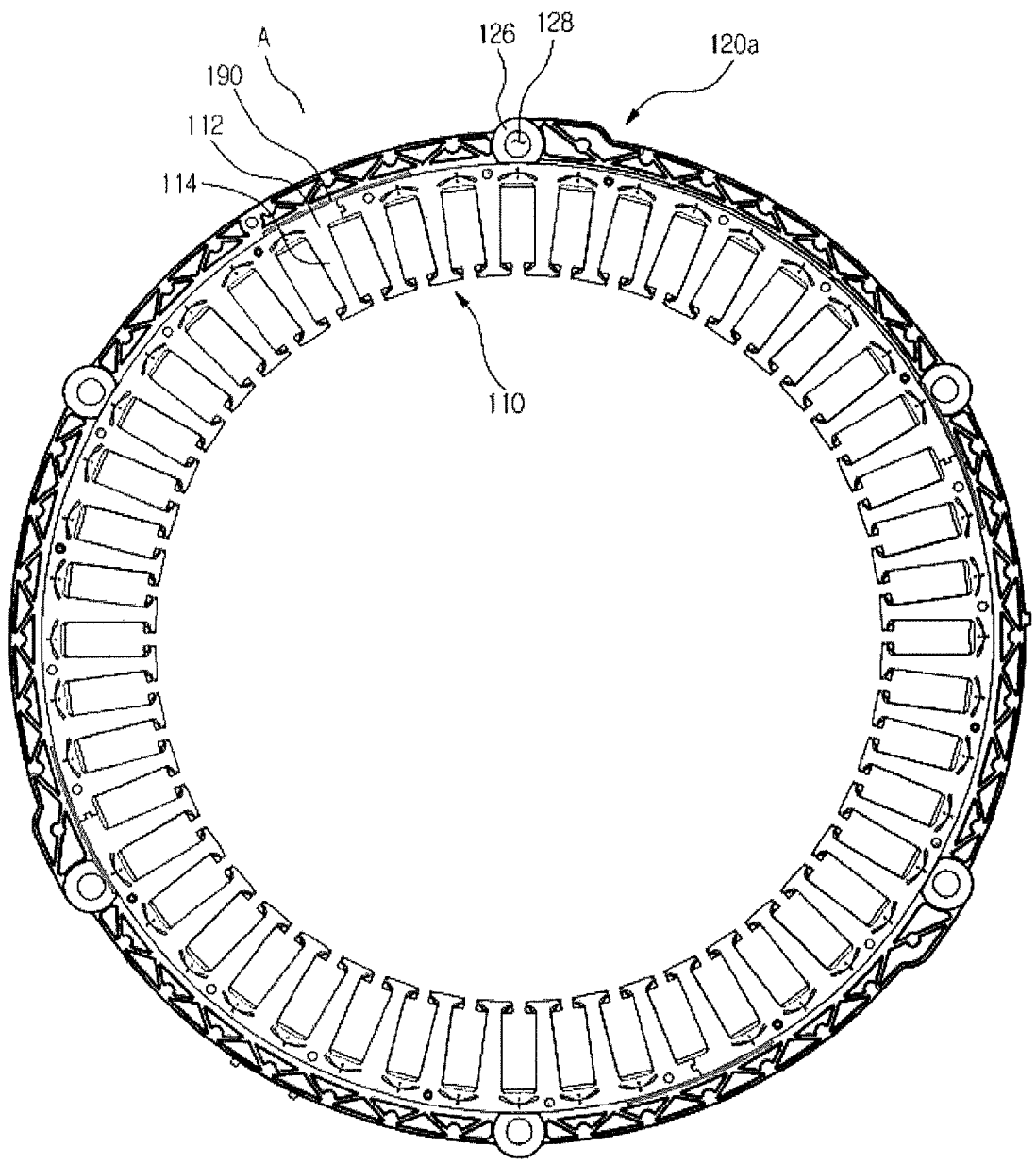
FIG. 8 is a plan view illustrating coupling between the first insulator and a stator core.
Figure 9:
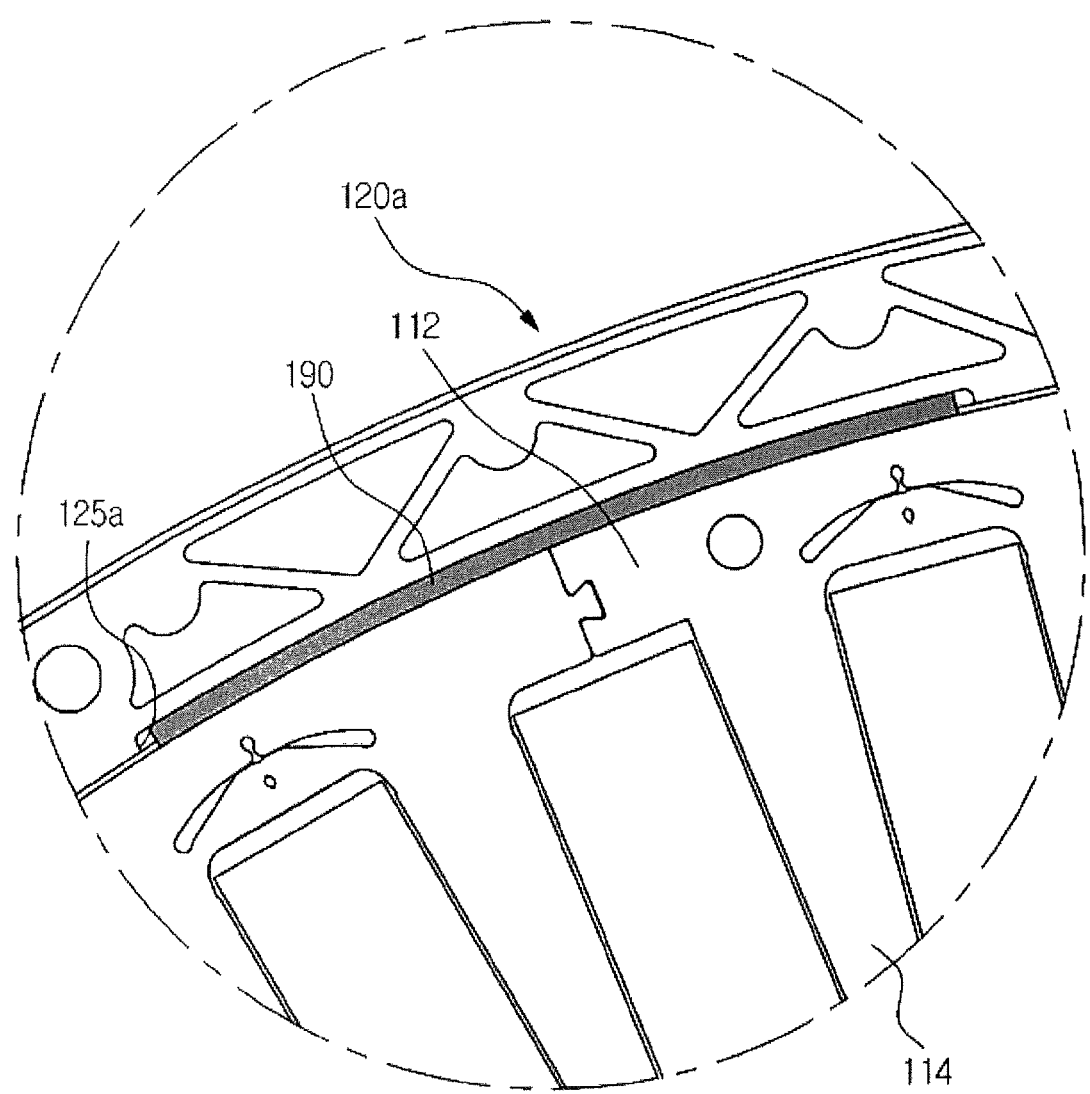
FIG. 9 is an enlarged view of section 'A' of FIG. 8.

FIG. 6 is a plan view illustrating the inside of a first insulator, and FIG. 7 is a plan view illustrating the inside of a second insulator. FIG. 8 is a plan view illustrating coupling between the first insulator and a stator core, and FIG. 9 is an enlarged view of section 'A' of FIG. 8.

As shown in FIGS. 4 to 9, the first insulator 120a includes a first core accommodation portion 121a to accommodate one end 110a of the stator core 110. The first core accommodation portion 121a is formed in a shape corresponding to the external shape of the stator core 110 to accommodate the stator core 110.

A first yoke accommodation groove 125a is provided on the inner circumferential surface of the first core accommodation portion 121a facing the outer circumferential surface of the stator core 110. At least two first yoke accommodation grooves 125a may be arranged spaced apart from each other along the inner circumferential surface of the first core accommodation portion 121a in the circumferential direction of the stator core 110.

The second insulator 120b includes a second core accommodation portion 121b to accommodate the other end 110b of the stator core 110. The second core accommodation portion 121b is formed in a shape corresponding to the external shape of the stator core 110 to accommodate the stator core 110.

A second yoke accommodation groove 125b is provided on the inner circumferential surface of the second core accommodation portion 121b facing the outer circumferential surface of the stator core 110. At least two second yoke accommodation grooves 125b may be arranged spaced apart from each other along the inner circumferential surface of the second core accommodation portion 121b in the circumferential direction of the stator core 110.

The first yoke accommodation groove 125a and the second yoke accommodation groove 125b are arranged at positions corresponding to each other to respectively accommodate one end and the other end of a back yoke 190 when the first insulator 120a and the second insulator 120b cover both ends 110a and 110b of the stator core 110.

The back yoke 190 is inserted between the first yoke accommodation groove 125a and the outer circumferential surface of the stator core 110 and between the second yoke accommodation groove 125b and the outer circumferential surface of the stator core 110.

The back yoke 190 is formed in the shape of a plate having a radius of curvature corresponding to that of the outer circumferential surface of the stator core 110. Once the back yoke 190 is inserted between the first yoke accommodation groove 125a and the outer circumferential surface of the stator core 110 and between the second yoke accommodation groove 125b and the outer circumferential surface of the stator core 110, the back yoke 190 protrudes more than the inner circumferential surface of the first core accommodation portion 121a and the inner circumferential surface of the second core accommodation portion 121b toward the center of the stator core 110 to support the stator core 110. Accordingly, when the stator core 110 is inserted into the first core accommodation portion 121a and the second core accommodation portion 121b, damage to the first insulator 120a and the second insulator 120b formed of a material having a lower strength than that of the stator core 110 may be prevented and the strength of the stator 100 may be reinforced.

At least two back yokes 190 may be arranged spaced apart from each other along the inner circumferential surfaces of the first core accommodation portion 121a and the second core accommodation portion 121b in a circumferential direction. Accordingly, even if the center of the stator core 110 is slightly misaligned with the centers of the first insulator 120a and the second insulator 120b when the stator core 110 is inserted into the first core accommodation portion 121a and the second core accommodation portion 121b at the initial state of assembly, the relative positions of the stator core 110, the first insulator 120a and the second insulator 120b with respect to each other is corrected by the back yoke 190 such that the center of the stator core 110 is aligned with the centers of the first insulator 120a and the second insulator 120b. As such, the back yoke 190 reduces the area of contact between the stator core 110 and the first insulator 120a and second insulator 120b, facilitating insertion of the stator core 110 into the first core accommodation portion 121a and second core accommodation portion 121b and thereby improving ease of assembly.

In addition, even if the stator core 110 has a diameter different from the designed value to some extent or the roundness thereof is a little high, such machining error or roundness may be compensated for by the back yoke 190 as the back yoke 190 contacts the outer circumferential surface of the stator core 110 when the stator core 110 is inserted into the first core accommodation portion 121a and the second core accommodation portion 121b. Therefore, poor connection between the stator core 110 and the first insulator 120a and second insulator 120b may be prevented.

The insulation film 130 is inserted between the first insulator 120a and the second insulator 120b.

The insulation film 130 is formed approximately in a bracket shape and is inserted between one of the first insulator teeth 124a and one of the second insulator teeth 124b neighboring each other to electrically insulate the stator core 110 and the coil 140. The insulation film 130 may be formed of paper or plastics which are electrically non-conductive.

The coil 140 is wound around the first insulator 120a, second insulator 120b and insulation film 130. When 3-phase alternating current (AC) power is supplied to the coil 140, magnetic flux is created at the stator core 110. The magnetic flux created at the stator core 110 interacts with the magnetic flux created at the rotor 200 to rotate the rotor 200.

Figure 10:
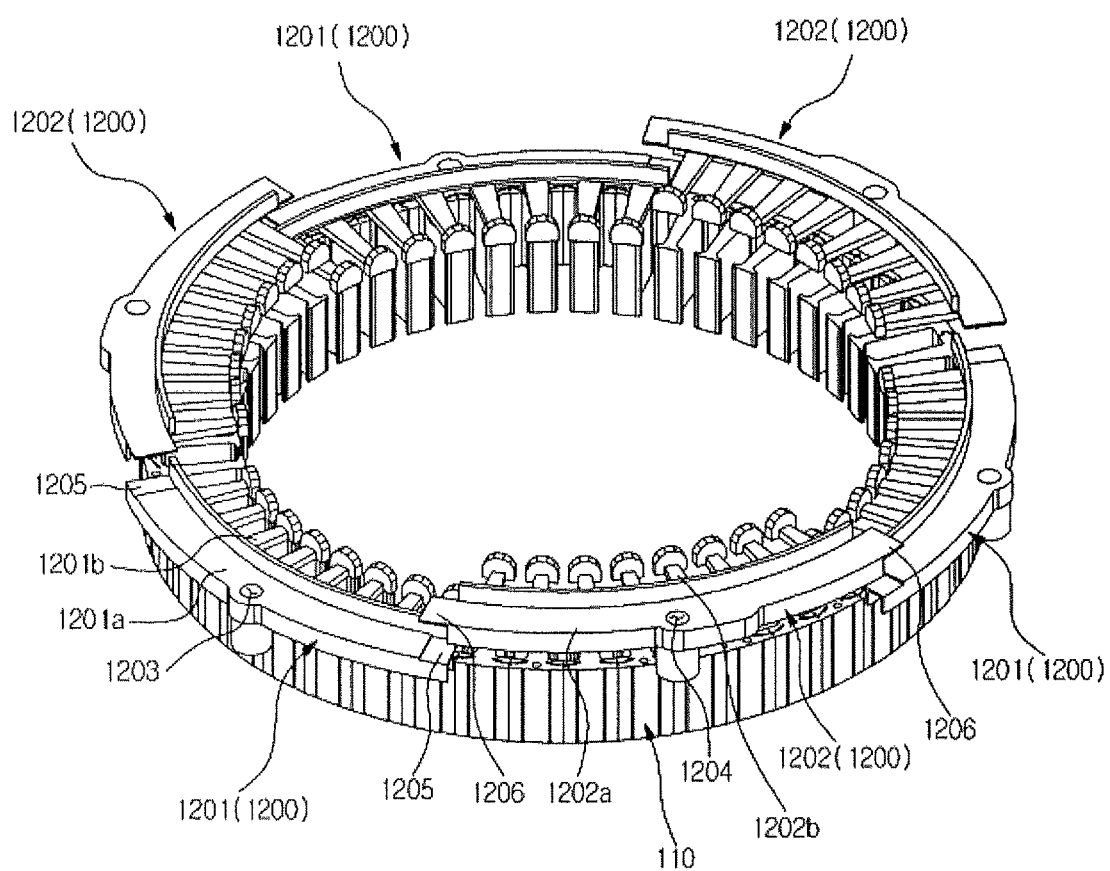
FIG. 10 is a perspective view illustrating an insulator assembly.

FIG. 10 is a perspective view illustrating an insulator assembly.

As shown in FIG. 10, the first insulator 120a may include a plurality of unit insulators 1200 to cover at least one portion of the stator core 110. If the first insulator 120a is formed by assembling segmented unit insulators 1200, the first insulator 120a may be defined as an insulator assembly.

The unit insulators 1200 include first unit insulators 1201 and second unit insulators 1202 which are alternately arranged.

Each of the first unit insulators 1201 includes a body 1201a formed in the circumferential direction of the stator core 110, a plurality of teeth 1201b extending inward from the body 1201a in the radial direction of the stator core 110, a first through hole 1203 formed through the body 1201a in the axial direction of the stator core 110 to fix the stator 100 to the rear wall 21 of the tub 20, and coupling grooves 1205 formed on both ends of the body 1201a in a stepped manner.

Each of the second unit insulators 1202 includes a body 1202a formed in the circumferential direction of the stator core 110, a plurality of teeth 1202b extending inward from the body 1202a in the radial direction of the stator core 110, a second through hole 1204 formed through the body 1202a in the axial direction of the stator core 110 to fix the stator 100 to the rear wall 21 of the tub 20 in cooperation with the first through hole 1203, and coupling protrusions 1206 protruding from both ends of the body 1202a in the circumferential direction of the body 1202a to be coupled to the coupling grooves 1205 of the first unit insulators 1201.

An assembler may couple the stator core 110 to the unit insulators 1200 by coupling the first unit insulators 1201 to the stator core 110 with a space placed between the first unit insulators 1201 and then placing each of the second unit insulators 1202 between the first unit insulators 1201 and coupling the same to the first unit insulators 1201. If plural segmented unit insulators 1200 rather than a single body are provided to be respectively coupled to the stator core 110 as above, possibility of occurrence of assembly failure may be reduced even when the dimensions of the stator core 110 are different from those of a plurality of the unit insulators 1200 to some extent. Further, in producing the first insulator 120a using an injection molding technique, a mold for segmented unit insulators 1200 has a smaller size than the mold for a single body, and therefore using the mold for segmented unit insulators 1200 reduces material costs and produces a relatively low amount of contraction which occurs in post treatment, thereby lowering dimensional error.

As is apparent from the above description, a motor according to an embodiment of the present disclosure allows water reaching the upper portion of the motor to be guided to the lower portion thereof along a moisture infiltration prevention member, thereby preventing short circuit caused by infiltration of water into the motor.

In another embodiment of the present disclosure, plural back yokes are arranged spaced apart from each other between a stator core and an insulator which configure a stator, and thereby roundness of the stator may be compensated and ease of assembly between the stator core and the insulator may be improved.

In another embodiment of the present disclosure, the insulator to cover the stator core is segmented into unit insulators such that the segmented unit insulators are individually coupled to the stator core, and therefore ease of assembly and productivity of a motor may be improved.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
   a body;
   a tub disposed in the body;
   a drum rotatably disposed in the tub; and
   a motor including a stator coupled to a rear surface of the tub and a rotor rotatably disposed inside the stator,
   wherein the stator comprises
      a stator core;
      a first insulator and a second insulator to cover both ends of the stator core; and
      at least one moisture infiltration prevention member disposed between the first insulator and the second insulator to prevent infiltration of moisture into the stator core,
      wherein the moisture infiltration prevention member protrudes from an outer circumferential surface of one of the first insulator and the second insulator in an axial direction of the stator core, the moisture infiltration prevention member extending in a circumferential direction of the stator core to cover approximately half of a lateral surface of the stator core that is not covered by the first insulator and second insulator.

2. The washing machine according to claim 1, wherein:
   the first insulator comprises at least one connection rib protruding from one end thereof facing the second insulator and connected to the second insulator; and
   the second insulator comprises at least one fixing rib protruding from one end thereof facing the tub to contact the tub and disposed at a position corresponding to a position of the connection rib.

3. The washing machine according to claim 2, wherein:
   the first insulator comprises a first through hole formed through the connection rib; and
   the second insulator comprises a second through hole formed through the fixing rib and disposed concentric with the first through hole.

4. The washing machine according to claim 2, wherein the moisture infiltration prevention member comprises at least one accommodation portion to accommodate the connection rib.

5. The washing machine according to claim 1, wherein the stator comprises a plurality of back yokes disposed between the stator core and the first insulator and second insulator to support the stator core.

6. The washing machine according to claim 5, wherein the back yokes are disposed spaced apart from each other along a circumferential direction of the stator core.

7. The washing machine according to claim 5, wherein the back yokes are inserted between an outer circumferential surface of the stator core and inner circumferential surfaces of the first insulator and the second insulator.

8. The washing machine according to claim 7, wherein the first insulator comprises a plurality of accommodation grooves to accommodate the back yokes,
   wherein the accommodation grooves are formed on the inner circumferential surface of the first insulator facing the outer circumferential surface of the stator core.

* * * * *